United States Patent [19]

Udupa et al.

[11] 3,909,369

[45] Sept. 30, 1975

[54] METHOD FOR THE PRODUCTION OF AN ELECTRODE FOR CATHODIC PROTECTION

[75] Inventors: Handady Venkatakrishna Udupa; Kapisthalam Chetlur Narasimham, both of Tamil Nadu, India

[73] Assignee: Council of Scientific & Industrial Research, New Delhi-L, India

[22] Filed: May 23, 1974

[21] Appl. No.: 472,813

[52] U.S. Cl................. 204/29; 204/57; 204/290 R; 204/196
[51] Int. Cl. .......................... C25d 5/34; C25d 11/02
[58] Field of Search...................... 204/29, 57, 290 R

[56] References Cited
UNITED STATES PATENTS

| | | | |
|---|---|---|---|
| 2,945,791 | 7/1960 | Gibson | 204/57 |
| 3,284,333 | 11/1966 | Parsi et al. | 204/29 |
| 3,454,472 | 7/1969 | Giuffrida | 204/57 |
| 3,668,085 | 6/1972 | Kiyohara et al. | 204/57 |

Primary Examiner—T. Tung
Attorney, Agent, or Firm—Hammond & Littell

[57] ABSTRACT

Method of anodizing lead base wherein lead dioxide pieces are incorporated into the surface of the base prior to anodizing. The lead dioxide pieces can be obtained by electrodeposition from a lead nitrate — copper nitrate bath.

5 Claims, No Drawings

METHOD FOR THE PRODUCTION OF AN ELECTRODE FOR CATHODIC PROTECTION

SYNOPSIS OF THE INVENTION

This invention relates to improvements in or relating to a method of forming lead dioxide on lead or its alloys in chloride medium.

It is known to employ lead dioxide coated lead or alloys as anode in the cathodic protection.

The anodes used in the cathodic protection are electrodes of lead or its alloys having a coating of lead-dioxide on same.

PRIOR ART

In the known art, lead dioxide coating is formed on lead or its alloys using a costly material like platinum as the micro-electrode. As is well known, the prior art employs platinum as microelectrode which is embedded in the lead or lead alloys and the same is anodized in sodium chloride (3%) solution or synthetic sea water to get a coating of lead dioxide on lead or lead alloys.

BACKGROUND AND OBJECTS

The process in the prior art becomes very costly because of the use of platinum micro-electrode.

It is an object of this invention to propose a cheaper method for preparing the anode for cathodic protection having a coating of lead dioxide.

It is another object of this invention to provide equally a satisfactory adherent coating of lead dioxide on lead or alloys of lead.

Other objects and advantages of this invention will be apparent from the following description.

DETAILED DESCRIPTION OF THE INVENTION

According to this invention the method for preparing an electrode for cathodic protection comprises incorporating a microelectrode of lead dioxide into the surface of lead or lead alloys, followed by anodizing the obtained combination in a chloride medium at a current density not exceeding 6 amperes/dm$^2$, at temperatures not exceeding 50°C for sufficient length of time to obtain an electrode having an adherent coating of lead dioxide on lead or its alloys.

The micro-electrode of lead dioxide can be prepared in various ways.

For example, according to one method the lead dioxide microelectrode is prepared from solid pieces of lead dioxide deposited from lead nitrate-copper nitrate bath on a suitable substrate like graphite, stainless steel or nickel (as described in Indian Pat. No. 66195, 124215) and were ground on the emery belt of 60 and 100 to the desired size and shape.

Alternatively the microelectrode is prepared by exposing the desired area on the substrate and stopping off the rest of the portion during electro-deposition of lead dioxide from nitrate bath.

PREPARATION OF MICRO ELECTRODE

The microelectrodes of lead dioxide are prepared in various ways.

For example, according to one method the lead dioxide microelectrode is prepared from solid pieces of lead dioxide deposited from lead nitrate-copper nitrate bath on a suitable substrate like graphite, stainless steel or nickel (as described in Indian Pat. No. 66195, 124215) and were ground on the emery belt of 60 and 100 to the desired size and shape.

Alternatively the microelectrode is prepared by exposing the desired area on the substrate and stopping off the rest of the portion during electro-deposition of lead dioxide from nitrate bath.

PREPARATION OF FINAL ELECTRODE

The microelectrodes of lead dioxide so prepared are then embedded into the lead or lead alloy surface. This can easily be done by drilling suitable holes in the lead or lead alloy surface and press-fitting the lead dioxide microelectrodes.

The combination thus obtained is anodized in a 0.5 to 3.0 % sodium chloride solution or synthetic sea water and the current density employed can vary between 0.5 and 6.0 A/dm$^2$. The temperature of polarization can be adjusted between 15° and 50°C.

By adjusting the time of polarization, satisfactory deposits of lead dioxide can be obtained. It is generally advantageous to maintain the ratio of the area of lead or lead alloy surface to the total surface of the lead dioxide microelectrode to be between 10 and 600. In pure chloride solution the deposit of lead dioxide was sometimes patchy but covering most of the portion of basis lead or its alloy.

To improve the adherence of the lead dioxide to the surface of lead or its alloys, the polo-arization mentioned above is carried out in a 0.5 to 3.0% by weight of a solution containing chloride and sulphate ions as found in sea water. The ratio of sulphate to chloride was 1:7. The deposit of lead dioxide obtained was very tough and adherent.

EXAMPLES

The following typical examples are given to illustrate the invention and are not to be construed as a limitation thereof.

| Example 1 | |
|---|---|
| Electrolyte | 3%(W/V)sodium chloride solution |
| Anode | Lead |
| Area of anode (cm$^2$) | 2.2 |
| Area of lead dioxide microelectrode (cm$^2$) | 0.12 |
| Cathode | Mild Steel |
| Area of cathode (cm$^2$) | 20 |
| Inter electrode distance (cm) | 6 |
| Cell voltage (volts) | 3.65 |
| Anode current density(A/dm$^2$) | 3 |
| Temperature (°C) | 30 ± 1 |
| Duration of polarization (hrs) | 4 |
| Example 2 | |
| Electrolyte | 3% (W/V) sodium chloride solution |
| Anode | Lead |
| Area of anode (cm$^2$) | 2.2 |
| Area of lead dioxide micro. electrode (cm$^2$) | 0.12 |
| Cathode | Mild steel |
| Area of cathode (cm$^2$) | 20 |
| Inter electrode distance (cm) | 6 |
| Cell voltage (volts) | 2.7–2.9 |
| Anode current density (A/dm$^2$) | 3 |
| Temperature (°C) | 50 ± 2 |
| Duration of polarization(hrs) | 4 |
| Example 3 | |
| Electrolyte | 3% (W/V) sodium chloride solution |
| Anode | Lead |
| Area of anode (cm$^2$) | 2.2. |
| Area of lead dioxide micro-electrode (cm$^2$) | 0.12 |

-Continued

| Example 1 | |
|---|---|
| Cathode | Mild Steel |
| Area of cathode (cm$^2$) | 20 |
| Inter electrode distance (cm) | 6 |
| Cell voltage (volts) | 3.6–3.9 |
| Anode current density (A/dm$^2$) | 3 |
| Temperature (°C) | 15 |
| Duration of polarization (hrs) | 4 |
| Example 4 | |
| Anode | Lead |
| Area of Anode (cm$^2$) | 19.54 |
| Area of microelectrode (cm$^2$) | 0.26 |
| Anode current density (A/dm$^2$) | 2.3 |
| Cathode | Mild Steel |
| Area of cathode (cm$^2$) | 60 |
| Inter electrode distance (cm) | 15 |
| Cell voltage (volts) | 4.2–7.0 |
| Temperature (°C) | 30.32 |
| Weight loss in 3% NaCl after 512 hours (mg/cm$^2$)/A hr.) | 0.330 |
| Weight loss in synthetic sea water after 483 hours (mg/cm$^2$/A hr.) | 0.072 |
| Example 5 | |
| Anode | Lead-antimony (6%) |
| Area of anode (cm$^2$) | 19.54 |
| Area of microelectrode (cm$^2$) | 0.26 |
| Anode current density (A/dm$^2$) | 2.3 |
| Cathode | Mild Steel |
| Area of cathode (cm$^2$) | 60 |
| Inter electrode distance (cm) | 15 |
| Cell voltage (volts) | 4.2–6.0 |
| Temperature (°C) | 30–32 |
| Weight loss in 3% NaCl after 445 hrs. (mg/cm$^2$/A.hr) | 0.035 |
| Weight gain in synthetic sea water after 482 hrs.(mg/cm$^2$)/A.hr) | 0.071 |
| Example 6 | |
| Anode | Lead-silver (1%) |
| Area of anode (cm$^2$) | 20.33 |
| Area of microelectrode (cm$^2$) | 0.252 |
| Anode current density (A/dm$^2$) | 2.5 |
| Cathode | Mild Steel |
| Area of cathode (cm$^2$) | 60 |
| Inter electrode distance (cm) | 15 |
| Cell voltage (volts) | 4.1–4.5 |
| Temperature (°C) | 30.35 |
| Weight loss in 3% NaCl after 524 hours (mg/cm$^2$/Ahr) | 180 |
| Weight gain in synthetic sea water after 482 hours (mg/cm$^2$A.hr) | 0.066 |

Having described the invention and ascertained the manner in which the same is to be carried out, what is claimed is the following:

1. A method for the preparation of a lead dioxide coated lead electrode for cathodic protection comprising electrodepositing lead dioxide on a conductive substrate from a lead nitrate-copper nitrate bath, incorporating solid pieces of said lead dioxide into the surface of a lead or lead alloy base and anodizing the obtained base in a chloride medium at a current density not exceeding 6 amperes/dm$^2$ at temperatures not exceeding 50°C for a sufficient length of time to obtain lead based electrode having an adherent coating of lead dioxide thereon.

2. A method as claimed in claim 1 wherein the conductive substrate is selected from the group consisting of graphite, steel and nickel.

3. A method as claimed in claim 1 wherein the lead dioxide pieces are embedded into the surface of lead or its alloy by simple press fitting of the pieces into suitably drilled holes in the surface of lead or its alloy.

4. A method as claimed in claim 1 wherein the anodization is carried out in a 0.5 to 3.0% sodium chloride solution optionally containing sulfate ions with a sulfate to chloride ratio of 1:7.

5. A method as claimed in claim 1 wherein the anodization is carried out at a current density of 0.5 to 6.0 A/dm$^2$. at temperatures between 15° and 50°C.

* * * * *